US007991703B1

(12) United States Patent
Watkins

(10) Patent No.: US 7,991,703 B1
(45) Date of Patent: Aug. 2, 2011

(54) SYSTEMS AND METHODS FOR PROVIDING A REAL ESTATE AND RENTAL MARKETPLACE

(75) Inventor: Christopher John Watkins, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 12/206,814

(22) Filed: Sep. 9, 2008

(51) Int. Cl.
*G06Q 50/00* (2006.01)
*G06Q 40/00* (2006.01)
(52) U.S. Cl. .............................. 705/313; 705/4; 705/35
(58) Field of Classification Search .................... 705/1
See application file for complete search history.

(56) References Cited

U.S. PATENT DOCUMENTS

| 6,871,140 | B1 | 3/2005 | Florance et al. | |
|---|---|---|---|---|
| 7,158,956 | B1 | 1/2007 | Himmelstein | |
| 2001/0005829 | A1 | 6/2001 | Raveis | |
| 2002/0049624 | A1* | 4/2002 | Raveis, Jr. ......................... | 705/8 |
| 2002/0052814 | A1 | 5/2002 | Ketterer | |
| 2004/0006521 | A1* | 1/2004 | Diamant et al. ................. | 705/35 |
| 2004/0030616 | A1* | 2/2004 | Florance et al. ................. | 705/27 |
| 2004/0054606 | A1 | 3/2004 | Broerman | |
| 2004/0133493 | A1* | 7/2004 | Ford et al. ........................ | 705/35 |
| 2004/0143450 | A1 | 7/2004 | Vidali | |
| 2005/0288958 | A1 | 12/2005 | Eraker et al. | |
| 2006/0026032 | A1 | 2/2006 | Higgins et al. | |
| 2006/0106625 | A1* | 5/2006 | Brown .............................. | 705/1 |
| 2006/0190278 | A1* | 8/2006 | Zimmerman et al. ............ | 705/1 |
| 2007/0043770 | A1* | 2/2007 | Goodrich et al. ........... | 707/104.1 |
| 2007/0225987 | A1* | 9/2007 | Gerold .............................. | 705/1 |
| 2007/0255581 | A1* | 11/2007 | Otto et al. ......................... | 705/1 |
| 2007/0255625 | A1* | 11/2007 | Katzen ............................ | 705/26 |
| 2008/0015890 | A1* | 1/2008 | Malyala ............................ | 705/1 |
| 2008/0275794 | A1* | 11/2008 | Ioimo et al. ...................... | 705/27 |
| 2008/0313094 | A1* | 12/2008 | Wright ........................ | 705/36 R |
| 2009/0240550 | A1 | 9/2009 | McCarty | |

OTHER PUBLICATIONS

Realtor.com "Real Estate Listings & Homes for Sale", Move, Inc., Jul. 2008, 2 pages.
finance.realtor.com/homefinance "Home Mortgage Center—Interest Rates, Mortgage Calculator, Refinancing Move.com", Move, Inc., Jul. 2008, 2 pages.

* cited by examiner

*Primary Examiner* — Traci L Casler
*Assistant Examiner* — Matthew Sittner
(74) *Attorney, Agent, or Firm* — Kilpatrick Townsend & Stockton LLP

(57) ABSTRACT

An environment provided by a financial entity in which buyers and sellers may be brought together to initiate and complete a transaction for the purchase of a property for sale or rental. The environment enables sellers to list items together with relevant information that buyers may need to understand the item. Buyers may apply for financing, insurance or other related services to receive approval to purchase properties. A mechanism by which the seller and buyer may communicate enables a negotiation process, scheduling and other processes associated with the sale or rental. After an agreement is reached between the buyer and seller, components associated with the environment, such property and casualty and banking may complete the necessary paperwork, etc. to close the deal.

14 Claims, 6 Drawing Sheets

SYSTEMS AND METHODS FOR PROVIDING A REAL ESTATE AND RENTAL MARKETPLACE

CROSS REFERENCES

This application is related by subject matter to the following commonly assigned applications: U.S. patent application Ser. No. 12/206,821, U.S. patent application Ser. No. 12/260,826, U.S. patent application Ser. No. 12/206,829, and U.S. patent application Ser. No. 12/206,835, each filed on even date and each entitled "Systems and Methods for Providing a Real Estate and Rental Marketplace." The disclosure of each application is incorporated by reference herein in its entirety.

BACKGROUND

Facilitating a real estate transaction requires the involvement of multiple businesses (e.g., banking, insurance, title attorneys, inspection companies, appraisers, etc.) with the buyers and sellers required to coordinate all of these disparate parties in order to complete the transaction. In addition, individuals interested in purchasing or renting real estate often desire to identify available properties that fall within the bounds of their selected search parameters (e.g., price range, square footage, number of bedrooms, etc.).

However, these individuals often do not know how much home they can afford, nor do they understand the other expenses associated with homeownership, as searches for properties for sale or rent typically performed on a website provided by a real estate agent or listing service. The agents or listing services do not understand the financial positions of the buyers as the searches are made, thus the search results often include properties that the buyer cannot afford.

The above problems are amplified for those buyers and sellers that wish to proceed without a realtor. Not only are there difficulties in scheduling appointments for buyers to visit seller's homes, there are difficulties in obtaining contracts for agreement of sale, appraisals, and other necessary steps in order for buyer to purchase a home for sale.

SUMMARY

An environment provided by a financial entity in which buyers and sellers may be brought together to initiate and complete a transaction for the purchase of a property for sale. The environment enables sellers to list properties together with relevant information that buyers may need to understand the properties. Buyers may apply for financing, insurance or other related services to receive approval to purchase properties. A mechanism by which the seller and buyer can communicate enables a negotiation process, scheduling and other processes associated with the sale to take place. After an agreement is reached between the buyer and seller, components associated with the environment, such property and casualty, and banking may complete the necessary paperwork, etc. to close the deal.

In some implementations, there is provided a method for providing a real estate marketplace. The method may include receiving financial information about a buyer to pre-qualify the buyer for a mortgage and homeowner's insurance coverage, and receiving buyer preference search criteria to query an information store containing information regarding homes for sale in a selected location. The results may be provided to the buyer and an indication of a selected home received from the buyer. A transaction portal may be provided wherein the buyer and a seller of the selected home negotiate a sale of the selected home.

In some implementations, a system for providing a real estate marketplace is provided. The system may include a subsystem for receiving financial information about a buyer to pre-qualify the buyer for a mortgage and homeowner's insurance coverage. A subsystem may be provided to receive buyer preference search criteria to query an information store containing information regarding homes for sale in a selected location. Another subsystem may provide the results may be provided to the buyer and receive an indication of a selected home received from the buyer. A transaction portal may be provided wherein the buyer and a seller of the selected home negotiate a sale of the selected home The foregoing is a summary and thus contains, by necessity, simplifications, generalizations, and omissions of detail. Those skilled in the art will appreciate that the summary is illustrative only and is not intended to be in any way limiting.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the present disclosure is not limited to the specific methods and instrumentalities disclosed. In the drawings.

DETAILED DESCRIPTION

Disclosed herein are systems and methods for compiling information regarding items for sale, such as homes, and for creating an environment in which buyers and sellers may be brought together to initiate and complete a transaction for the purchase/rental of a property. The environment enables sellers to list properties together with relevant information that buyers may need to understand the property. Buyers may apply for financing, insurance or other related services to receive approval to purchase properties. After an agreement is reached between the buyer and seller, entities associated with the environment may complete the necessary paperwork, etc. to close the deal.

Figure 1:
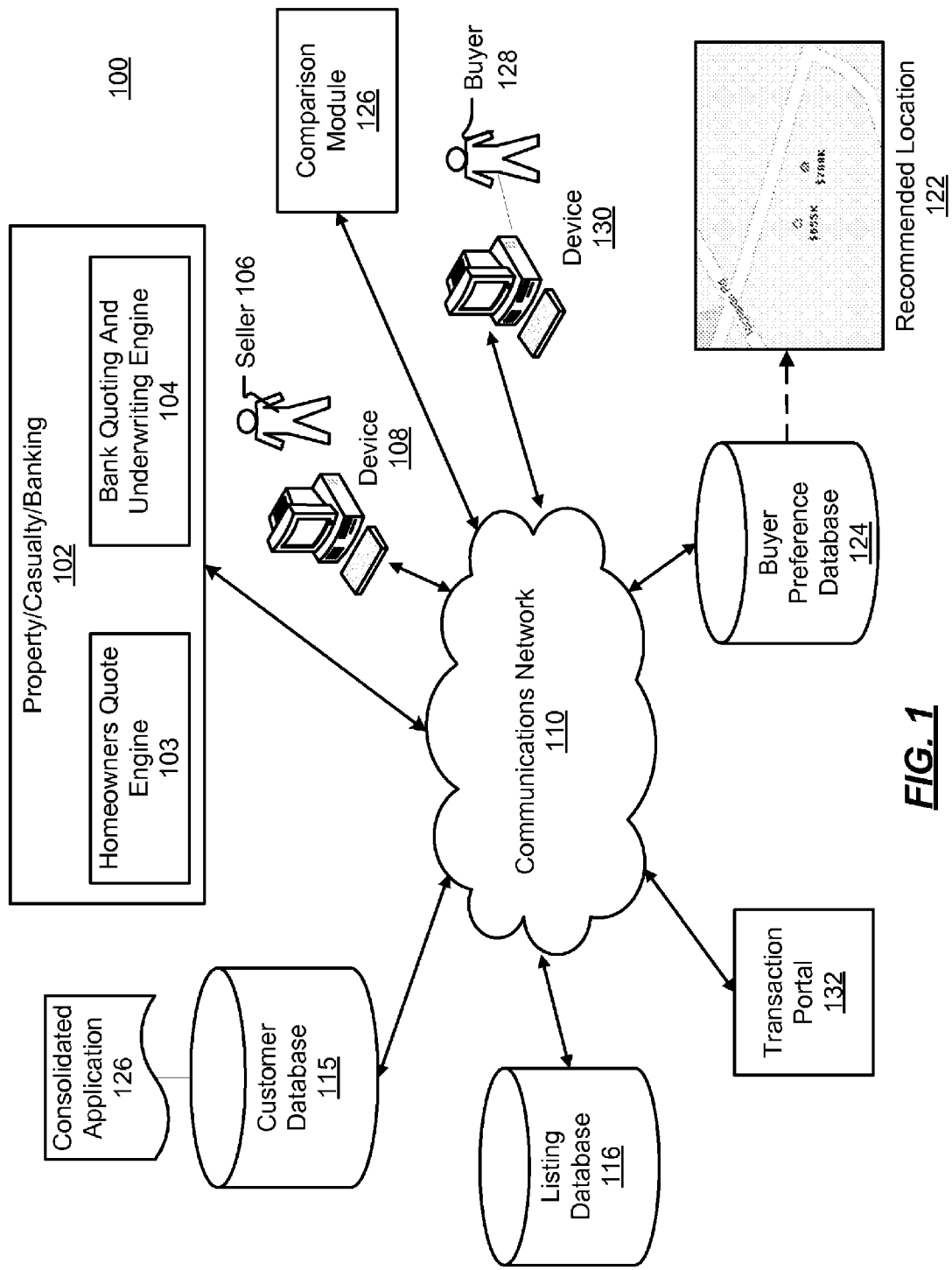
FIG. 1 depicts an example configuration of a system that compiles location-relevant information and recommends locations to a user.

FIG. 1 illustrates an example environment 100 in which implementations described herein may be employed. Within the environment 100, there may be a seller 106 and a device 108, such as a personal computer, associated with the seller 106. The environment 100 may include a listing database 116 that contains listings of homes or other properties for sale or rent in one or more geographic areas. The seller 106 may submit information about a property for sale or rent to the listing database 116. The seller 106 may also opt for an appraisal ordered through a financial entity 102 that may be used to set the listing price. As will be described below, because the financial entity 102 has ordered an appraisal for the property, it may be used for closing purposes after an agreement of sale is reached with a buyer.

Within the environment may be a buyer 128 and associated device 130, such as a personal computer, that may be used to provide information to the financial entity 102 or a buyer preference database 124. The financial entity 102 may provide insurance and/or financing to buyers of properties within the environment 100. The financial entity 102 may have a homeowners quote engine 103 and a bank quote and underwriting engine 104. The homeowners quote engine 103 may receive information such as the buyer's claims history and credit rating, as well as preliminary information regarding maintenance, construction and location of a home to be purchased. From this information, the homeowners quote engine 103 may pre-qualify a buyer with homeowners insurance. The pre-qualification represents a maximum amount for which the buyer may be insured.

The bank quote and underwriting engine 104 may receive information from the buyer regarding the buyer's gross income, an amount of cash available for a down payment, anticipated settlement costs and cash reserves required by the lender of outstanding debts, the buyer's credit history, a type of mortgage selected, and current interest rates. The bank quote and underwriting engine 104 may take into account an expense-to-income ratio by calculating the buyer's projected monthly housing expense, which consists of the principal and interest payment on a new home loan, property taxes and hazard insurance. From this information, the bank quote and underwriting engine 104 may pre-qualify the buyer 128 for a mortgage loan product(s). The pre-qualification represents a maximum loan amount for which the buyer is eligible.

The information provided by the buyer 128 to the financial entity 102 as part of a process of qualifying for homeowners insurance and a mortgage may be compiled into a consolidated application 126. The consolidated application 126 may be stored in a customer database 115 associated with the financial entity 102. The customer database 115 may include information about the seller 106 or the buyer 128.

The buyer 128 may also choose to fill out a financial advice center questionnaire provided by the financial entity 102 that aids the buyer in determining if home ownership is the right option, how much property he/she can afford, or if renting is a better option given the buyer's finances.

The preference database 124 may include user preferences that are associated with the buyer 128. The preference database 124 may include buyer preferences such as, a desired number of bedrooms, a desired number of bathrooms, a desired price range, and subjective characteristics about a desired location (e.g., bike friendly, wide selection of restaurants, high percentage of properties with children, etc.). If the buyer 128 is a realtor or a business service, the preference database 124 may be associated with a client of the buyer 128. The buyer 128 may use the device 130 to input preferred criteria and/or preferences regarding properties or areas of interest into the preference database 124.

The listing database 116 may include listings and details about items, such as property for sale or rent in a particular location. For example, the listing database 116 may be a listing service such as those that provide basic real estate information specific to realty that is for sale or rent. These details may be data about the property, such as the number of bedrooms, price range, or if there is a pool, for example. The listing database 116 may also compile information specific to the property, such as realty sale history, zoning parameters, or an estimated property value, for example.

The listing database 116 may compile information about the zip code, which may include basic real estate details about properties, for sale or not, within that zip code. The listing database 116 may also include other objective details associated to the recommended location 122, such as neighborhood demographics, grocery store locations, realty information, any available realty locations, neighborhood demographics, realty sale history, etc.

The listing database 116 may also contain subjective or social networking information about properties. For example, prospective buyers of real estate in an area may be interested in knowing a resident's opinion and assessment of location-relevant attributes, such as how busy they think traffic is in the area, or if a neighbor has an incessantly barking dog. Prospective renters may want opinions from current or previous tenants, such as their opinion about whether an apartment building is "kid-friendly," or if their property owner has a tendency to delay fixing reported problems.

The environment 100 may include a comparison module 126 that may match the properties contained in the listing database 116 with information in the buyer preference data 124 or near real-time queries to determine a recommended location 122. The recommended location 122 may be defined narrowly, such as a single property location, or the location may be defined broadly and encompass, for example, a neighborhood, a region, an apartment complex, etc. The recommended location 122 may be viewed on a website provided by the financial entity 102. The buyer 128 may be provided listings that show an exact monthly mortgage and insurance costs for the property they are viewing, as this information may be combined from the listing database 116 and the customer database 115. In some implementations, if the buyer has created a financial profile (stored in the customer database 115), he/she can restrict property listings to only those that fit his/her financial goals.

A transaction portal 132 provides an environment in which a buyer 128 and seller 106 may virtually meet to negotiate the sale and purchase or rental of the property. The buyer 128 may arrange to see a property through a communication preference designated by the seller 106. If the buyer 128 likes the property, the buyer 128 and seller 106 may agree to a price in writing using the transaction portal 132.

In some implementations, the seller 106 and buyer 128 may log into a website provided by the financial entity 102, and notify the entity of the final conditions and their preferred closing date. The financial entity 102 may arrange for one or more of the following that typically occur when purchasing a home: an inspection, if required, and an appraisal if not already completed, scheduling the closing, securing a closing attorney, securing title insurance, securing a termite bond, etc. The financial entity 102 may then issue the homeowner policy effective on the closing date. As such, the buyer 106 and seller 128 need only to show up at the closing to sign the papers to complete the transaction.

Each of the databases 115, 116, and 124, either separately or combined, may be provided as a database management system, an object-oriented database management system, a relational database management system (e.g. Oracle, Access, etc.), a file system or another conventional database package. Further, the databases can be accessed via a Structure Query Language (SQL) or other tools known to one of ordinary skill in the art.

The network 110 may be any network that facilitates wireless communications, may also include wired communication capabilities, and may communicate with other wired and wireless networks. Any and all such networks are contemplated as within the present disclosure. Examples of such networks include telephony radio networks such as global system for mobile communication ("GSM") networks and code division multiple access ("COMA") networks, wireless computer networks such as Wi-Fi and IEEE 802.11 networks, and wired networks such as local area networks ("LANs"), wide area networks ("WANs"), intranets, and the Internet. The network 110 represents any possible combination of such networks, including a wireless network that may connect to the Internet and communicate with other devices that are connected, directly or indirectly, to the Internet.

As noted above, facilitating a real estate transaction requires the involvement of multiple businesses (e.g. banking, insurance, title attorneys, inspection companies, appraisers, etc.) with the buyers and sellers required to coordinate all of these disparate parties in order to complete the transaction, particularly if the parties wish to proceed without a realtor. The financial entity 102 provides a solution to this problem by integrating separate financial/insurance components. A property and casualty component may handle homeowners insurance, a real estate listing service may provide listings and search capabilities of the listings, and a banking component may set up the mortgage and coordinate the inspection, appraisal, title insurance, and closing. Thus, a collaboration of the components in the environment 100 may result in the aggregation of the entire home buying and selling transaction into one Internet site and/or one company (e.g., entity 102).

Further, the environment 100 may be used to provide listings or rental properties to prospective renters, or other items such as motorcycles, automobiles, boats, airplanes, etc.

Figure 2:
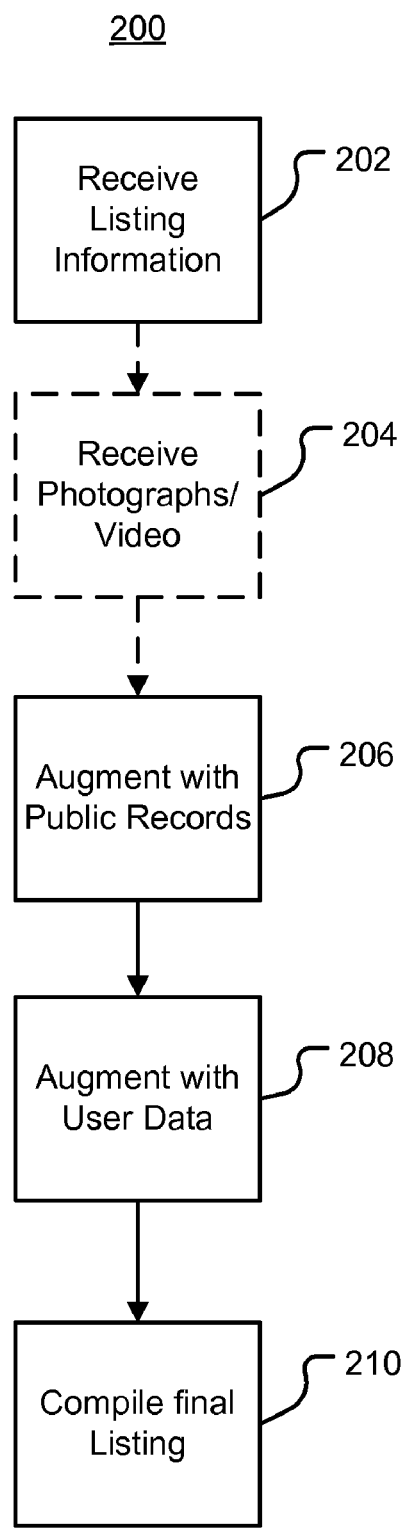
FIG. 2 illustrates an operational flow diagram of a seller process in a real estate and rental marketplace.

FIG. 2 illustrates an operational flow diagram 200 of a seller process in a real estate and rental marketplace. At 202, listing information is received. For example, this may be information regarding at property for sale that the seller 106 would like to make available to potential buyers for viewing. The listing information may include, but is not limited to, a price, a square footage of the home, a number of bedrooms, a number of bathrooms, and other details of the property that may be of interest to buyers. At 204, photographs and/or video may be received. In this optional element of the process, photographs or video of the home may be associated with the listing information, such that buyers may be provided images of the property for sale. Such pictures or video may include pictures or video to highlight the exterior of the home, selected rooms in the interior of the home, and to highlight specialty items (e.g., appliances) within the home.

At 206, the listing information may be augmented with public record information. For example, tax records may be queried for additional information about the property. This information may include annual property taxes, lot size, official square footage, assessed value, etc. This information may be used to verify information provided by the seller 106, or to provide additional information that the seller has not, or is unable to provide at 202.

At 208, the listing information may be augmented with user data. The user data may be information stored in the user database 115 that the financial entity 102 may have compiled through its relationship with the seller 106. This information may include details such as the construction of the home (e.g., wood, brick, stone, etc.), additional specialty items not specified by the seller (e.g., a stained-glass window in the entryway), etc. This information may be retrieved in accordance with a seller indication allowing the retrieval of information from the user database 115 in order to respect the privacy of the seller.

At 210, the final listing is compiled. The information obtained in 202-208 may be compiled into a final listing that is stored in the listing database 116, and made available to prospective buyers 124. The process of FIG. 2 may occur at any time to place the seller's property for sale in the real estate and rental marketplace.

Figure 3:
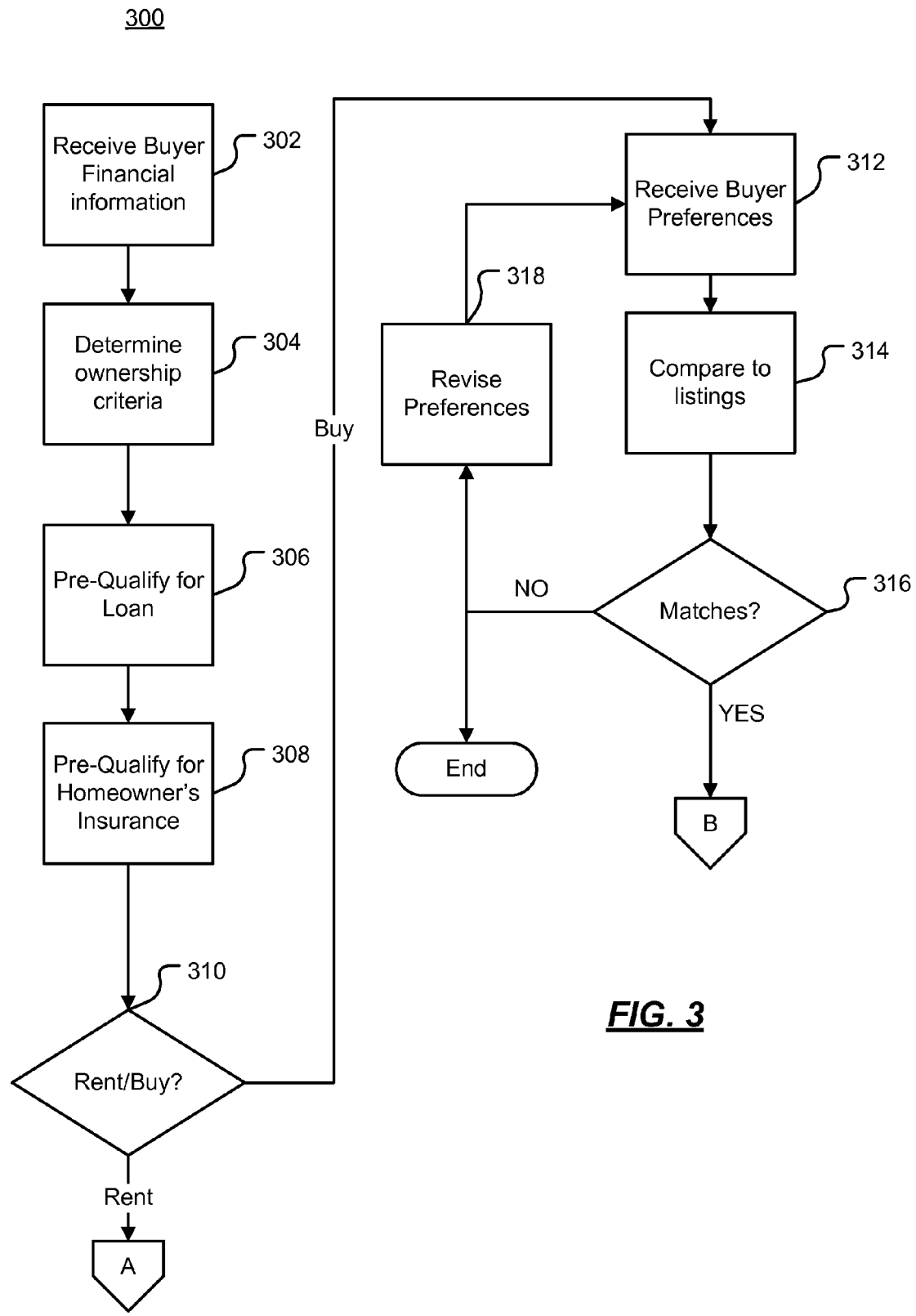
FIGS. 3-5 illustrate operational flow diagrams of a buyer/renter processes in the real estate and rental marketplace.
Figure 4:
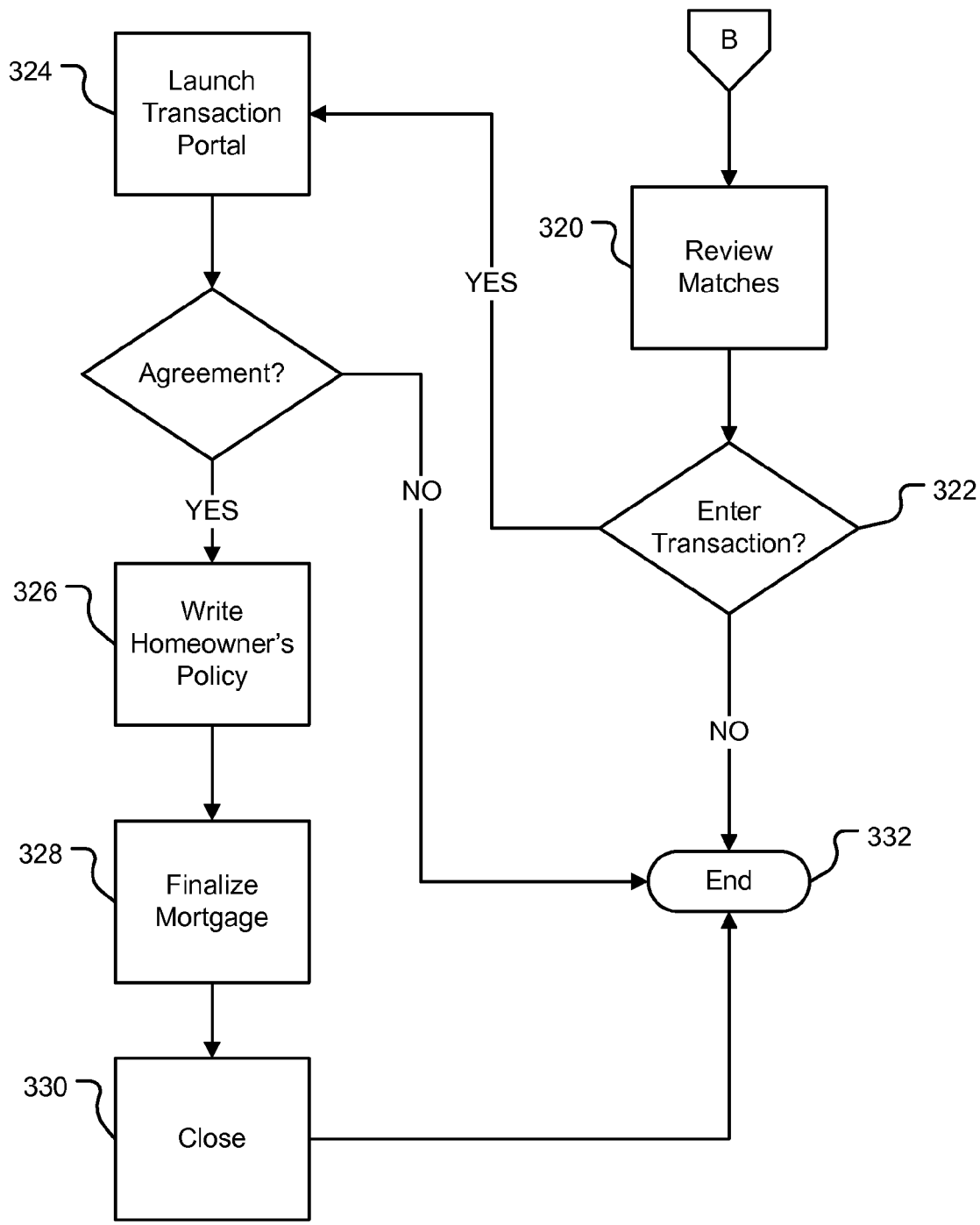
Figure 5:
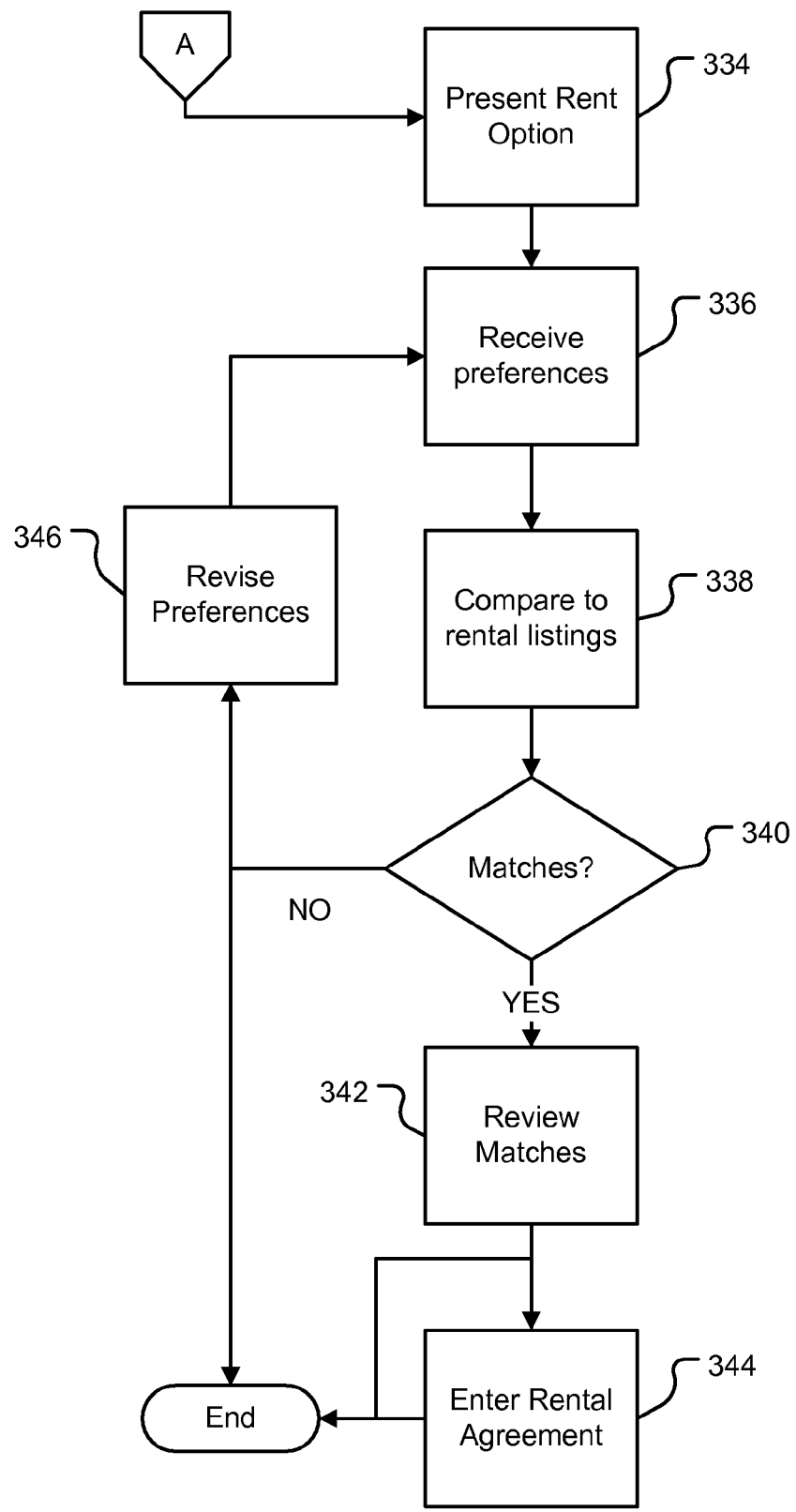

FIGS. 3-5 illustrate operational flow diagrams of the buyer/renter processes in the real estate and rental marketplace. Referring to FIG. 3, at 302, financial information regarding the buyer is received. For example, a prospective buyer may log on to a website provided by the financial entity 102 to enter information about the financial condition of the buyer. This information may include, but is not limited to, income from all sources, monthly expenses, outstanding loans, credit card debt, etc.

At 304, ownership criteria may be determined. For example, from the information provided 302 the financial entity 102 may determine how much house the buyer can afford based on information in the consolidated application 126. In other words, the maximum monthly mortgage, insurance, and other expenses associated with homeownership that the buyer can safely afford. At 306, the buyer may be pre-qualified for a mortgage loan. Using the information provided 302, the financial entity 102 may determine a maximum loan amount for which the buyer may be qualified.

At 308, the buyer may be pre-qualified for homeowners insurance. Based an amount determined at 304 and/or 306, the financial entity 102 may determine if the buyer can be prequalified for insurance. At 310, it is determined if the prospective buyer desires to rent or buy. For example, if the prospective buyer qualifies for a loan and homeowners insurance at 306 and 308, the buyer may provide one or more preferences at 312 for homes of interest.

For example, the buyer may specify a selling dollar amount, a number of bedrooms, a number of bathrooms, or other features of interest in a property that the buyer would like to purchase. In some implementations, the buyer preferences may be used as a query run against the listing database 116. In some implementations, the buyer preferences may be stored in the buyer preference database 124 such that the preferences may be automatically and/or periodically run against listings maintained in the listing database 116.

At 314, the buyer preferences are compared to the listings. For example, the preferences received and/or stored at 312 may be run against the listings in the listing database 116 to determine if there are any properties for sale that match, or approximately match within a predetermined tolerance, the buyer preferences.

At 316, it is determine if any matches results from the comparison performed at 314. If no matches result, then the buyer may revise his/her preferences at 318 in the comparison may be rerun at 312 and 314. Optionally, the buyer may choose to end the process.

If, at 316, there are properties for sale that match the buyer preferences, then at 320 (FIG. 4), the buyer is provided an opportunity to review the matches. The matches may be presented in a user interface and listed from, e.g., highest price to lowest price, by number of bedrooms, a number of bathrooms, by total square footage, etc. The buyer may be provided an opportunity to sort the list of matches in a way that suits the buyer's preferences.

If, at 322, it is determined if the buyer decides not to enter into a transaction to purchase a property from the seller, the process ends at 332. However, if at 322, it is determined that the buyer wants to enter into a transaction to purchase a selected property from a seller, then at 324, a transaction portal may be provided to the buyer. The transaction portal 132 provides a user interface in which the buyer may receive from, e.g., the financial entity 102 an appropriate contract for an agreement of sale in the geographic jurisdiction in which the properties for sale. The contract may be a template that enables the buyer to specify terms and conditions (e.g., an offer price, contingencies, etc.).

In some implementations, the transaction portal 132 may provide a way to communicate the offer to the seller of a property through, e.g., a secure tradition mechanism. A seller may receive the offer through the transaction portal and either accept the offer or submit a counteroffer for consideration by the buyer. This process may continue until the buyer and seller reach agreement or decide that no agreement is reachable where the process ends.

In some implementations, the transaction portal 132 may be used to arrange meeting times where the buyer may visit the seller's property in-person. The transaction portal 132 may also be used to arrange closing times, inspection visits, appraisals, etc. to enable all the processes that maybe necessary to complete the purchase of a property.

If the buyer and seller reach an agreement, then at 326, the financial entity 102 may write a homeowner's policy for the buyer. At 328, the financial entity 102 may finalize the mortgage. The financial entity 102 may also arrange for any necessary components for the closing. At 330, the buyer and seller close the sale of the property and the process ends at 332.

Referring again to 310 (FIG. 3), if the buyer decides to rent, then at 334 (FIG. 5), rental options are presented to the buyer (now a prospective renter). The renter may provide one or more preferences at 336 for properties that he/she would like to rent. For example, the renter may specify a monthly rental amount, a number of bedrooms, a number of bathrooms, or other features of interest. In some implementations, the renter preferences may be used as a query run against rental properties in the listing database 116. In some implementations, the renter preferences may be stored in the buyer preference database 124 such that the preferences may be automatically and/or periodically run against rental property listings maintained in the listing database 116.

At 338, the renter preferences are compared to the rental property listings. For example, the preferences received and/or stored may be run against the rental property listings in the listing database 116 to determine if there are any properties for rent that match, or approximately match within a predetermined tolerance, the renter's preferences.

At 340, it is determine if any matches results from the comparison performed at 338. If no match is result, then the renter may revise his/her preferences at 346, and the comparison may be rerun at 336 and 338. Optionally, the renter may choose to end the process.

If, at 340, there are properties for rent that match the renter's preferences, then at 342, the renter is provided an opportunity to review the matches. The matches may be presented in a user interface listing properties from e.g. highest rental price to lowest rental price, by number of bedrooms, a number of bathrooms, etc. The renter may be provided an opportunity to sort the list of matches in a way that suits the renter's preferences.

The renter may enter into a rental agreement at 344 or end the process after reviewing the matches. The rental agreement may be entered into using the transaction portal 132, as noted above, which would provide a user interface in which the renter may sign and return a rental agreement to the owner of the property for rent. The financial entity 102 may provide for renter's insurance and certify a renter's policy as part of the negotiations/rental agreement.

Thus, the environment 100 is also scalable such that the same functionality that is used to list and view properties for sale may be used to list and view rental properties.

One of ordinary skill in the art would now recognize that the flow of the operation diagrams in FIGS. 2-5 may occur in a different order than shown in the FIGS. For example, 304-310 may occur after the buyer preferences are received. Other permutations are within the scope of the appended claims.

Figure 6:
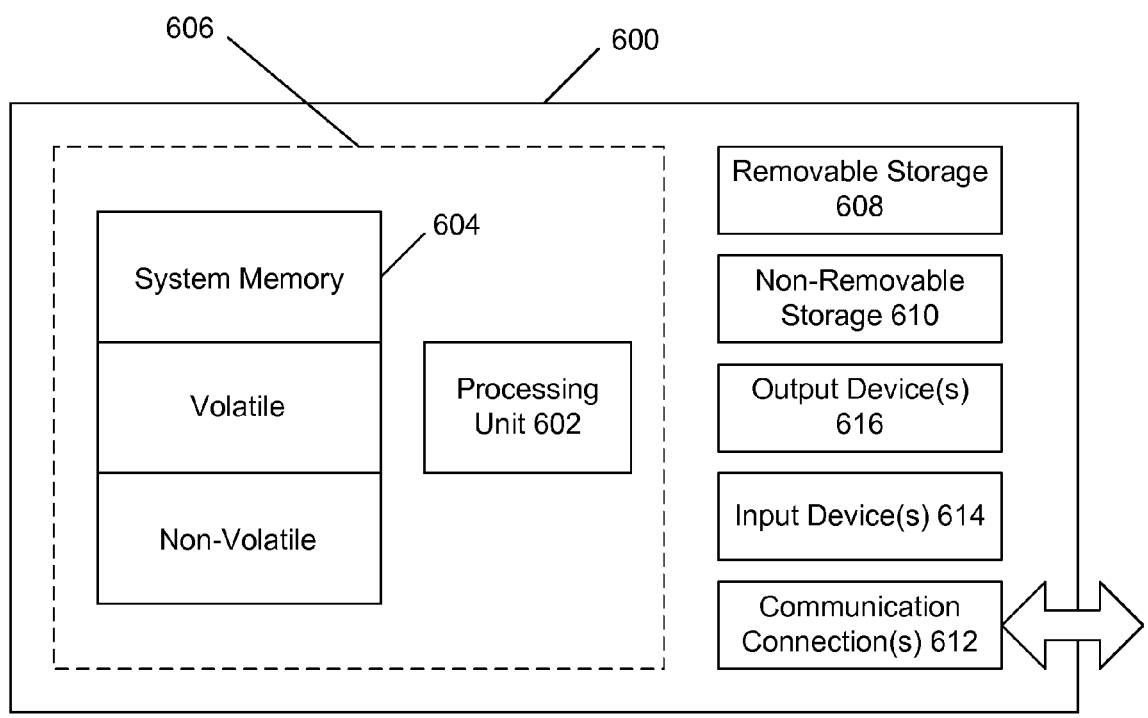
FIG. 6 illustrates an exemplary computing environment.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules being executed by a computer, may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and system memory 604. Depending on the exact configuration and type of computing device, system memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features and/or functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer-readable media. Computer-readable media can be any available media that can be accessed by computing device 600 and include both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 604, removable storage 608, and non-removable storage 610 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may also contain communication connection(s) 612 that allow the computing device 600 to communicate with other devices. Communication connection(s) 612 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

Computing device 600 may be one of a plurality of computing devices 600 inter-connected by a network. As may be appreciated, the network may be any appropriate network, each computing device 600 may be connected thereto by way of communication connection(s) 612 in any appropriate manner, and each computing device 600 may communicate with one or more of the other computing devices 600 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for providing a real estate marketplace, the method comprising:
providing a computer having a processor and memory;
receiving financial information about a buyer,
pre-qualifying the buyer for a mortgage;
pre-qualifying the buyer for homeowner's insurance coverage;
thereafter, receiving buyer preference criteria;
querying, using the processor, an information store containing information regarding homes for sale in a selected location;
determining, based on pre-qualifying a buyer for the mortgage and for homeowner's insurance coverage, a listing of homes for sale in the selected location for which the buyer is pre-qualified for a mortgage and pre-qualified for homeowner's insurance coverage;
providing results to the buyer by merging information about the buyer and the listing of homes for sale in the selected location using the processor, the results including a total cost of ownership of the homes for sale based on information provided by both the buyer and seller of the homes for sale;
receiving an indication of a selected home from the buyer; and
providing a transaction portal wherein the buyer and a seller of the selected home negotiate a sale of the selected home.

2. The method of claim 1, further comprising providing an analysis to the buyer of how much the buyer can afford based on the received financial information.

3. The method of claim 2, further comprising advising the buyer to rent a property rather than buy a property.

4. The method of claim 1, further comprising:
providing a contract for a sale of the selected home to the buyer; and
communicating a signed offer on the selected home from the buyer to the seller using the transaction portal.

5. The method of claim 4, further comprising:
providing the signed offer to the seller at the transaction portal; and
receiving a counter-offer or signed agreement using the transaction portal that is communicated to the buyer.

6. The method of claim 5, further comprising:
arranging financing and insurance for the buyer based on the signed agreement being communicated to the seller; and
arranging a closing on the selected home.

7. The method of claim 1, further comprising:
maintaining the buyer preferences in a database stored in the memory;
querying the information store on a periodic basis; and
presenting results of the periodic query to the buyer.

8. A system for providing a real estate marketplace, the system comprising:
- a processor;
- a computer-readable medium coupled to the processor and storing a plurality of instructions, which, when executed, cause the processor to provide the real estate marketplace, the plurality of instructions comprising:
- instructions that cause the processor to receive financial information about a buyer;
- instructions that cause the processor to pre-qualify the buyer for a mortgage;
- instructions that cause the processor to pre-qualify the buyer for homeowner's insurance coverage;
- instructions that cause the processor to thereafter receive buyer preference criteria;
- instructions that cause the processor to query an information store containing information regarding homes for sale in a selected location;
- instructions that cause the processor to determine, based on pre-qualifying a buyer for the mortgage and for homeowner's insurance coverage, a listing of homes for sale in the selected location for which the buyer is pre-qualified for a mortgage and pre-qualified for homeowner's insurance coverage;
- instructions that cause the processor to provide results to the buyer by merging information about the buyer and the homes for sale in the selected location, the results including a total cost of ownership of the homes for sale based on information provided by both the buyer and seller of the homes for sale;
- instructions that cause the processor to receive an indication of a selected home from the buyer; and
- instructions that cause the processor to provide a transaction portal wherein the buyer and a seller of the selected home negotiate a sale of the selected home.

9. The system of claim 8, further comprising instructions that cause the processor to provide an analysis to the buyer of how much the buyer can afford based on the received financial information.

10. The system of claim 9, further comprising instructions that cause the processor to advise the buyer to rent a property rather than buy a property.

11. The system of claim 8, further comprising:
- instructions that cause the processor to provide a contract for a sale of the selected home to the buyer; and
- instructions that cause the processor to communicate a signed offer on the selected home from the buyer to the seller using the transaction portal.

12. The system of claim 11, further comprising:
- instructions that cause the processor to provide the signed offer to the seller at the transaction portal; and
- instructions that cause the processor to receive a counter-offer or signed agreement using the transaction portal that is communicated to the buyer.

13. The system of claim 12, further comprising:
- instructions that cause the processor to arrange financing and insurance for the buyer based on the signed agreement being communicated to the seller; and
- instructions that cause the processor to arrange a closing on the selected home.

14. The system of claim 8, further comprising:
- instructions that cause the processor to maintain the buyer preferences in a database;
- instructions that cause the processor to query the information store on a periodic basis; and
- instructions that cause the processor to present results of the periodic query to the buyer.

* * * * *